(12) United States Patent
Chuang et al.

(10) Patent No.: US 8,837,319 B2
(45) Date of Patent: *Sep. 16, 2014

(54) METHOD AND SYSTEM FOR INTEGRATED LINK ADAPTATION AND POWER CONTROL TO IMPROVE ERROR AND THROUGHPUT PERFORMANCE IN WIRELESS PACKET NETWORKS

(71) Applicant: AT&T Intellectual Property II, L.P., Atlanta, GA (US)

(72) Inventors: Justin Che-I Chuang, Holmdel, NJ (US); Kin K. Leung, Edison, NJ (US); Li-Chun Wang, Eatontown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,343

(22) Filed: Apr. 29, 2013

(65) Prior Publication Data

US 2013/0235752 A1    Sep. 12, 2013

Related U.S. Application Data

(63) Continuation of application No. 13/037,306, filed on Feb. 28, 2011, now Pat. No. 8,432,863, which is a continuation of application No. 12/381,292, filed on Mar. 10, 2009, now Pat. No. 7,920,505, which is a continuation of application No. 09/570,097, filed on May 12, 2000, now Pat. No. 7,502,340.

(51) Int. Cl.
*H04L 1/00* (2006.01)
*H04W 52/20* (2009.01)
*H04W 24/02* (2009.01)
*H04L 27/00* (2006.01)
*H04W 28/18* (2009.01)
*H04W 28/04* (2009.01)
*H04W 4/08* (2009.01)

(52) U.S. Cl.
CPC .............. *H04W 24/02* (2013.01); *H04W 28/18* (2013.01); *H04W 28/04* (2013.01); *H04W 52/20* (2013.01); *H04L 1/0015* (2013.01); *H04W 4/08* (2013.01); *H04L 1/0019* (2013.01); *H04L 1/0003* (2013.01); *H04L 27/0008* (2013.01)
USPC ........................................................ 370/252

(58) Field of Classification Search
None
See application file for complete search history.

(56) References Cited

U.S. PATENT DOCUMENTS

| | | | |
|---|---|---|---|
| 5,579,306 A * | 11/1996 | Dent | 370/330 |
| 5,659,569 A | 8/1997 | Padovani et al. | |
| 5,734,967 A | 3/1998 | Kotzin et al. | |
| 6,167,031 A * | 12/2000 | Olofsson et al. | 370/252 |
| 6,341,225 B1 * | 1/2002 | Blanc | 455/522 |
| 6,404,755 B1 | 6/2002 | Schafer | |
| 6,405,046 B1 * | 6/2002 | Kumaran et al. | 455/453 |

(Continued)

*Primary Examiner* — Chi Pham
*Assistant Examiner* — Kouroush Mohebbi
(74) *Attorney, Agent, or Firm* — Abel Law Group, LLP

(57) ABSTRACT

The invention provides a system that implements an algorithm for integrated link adaptation and power control to achieve specified error rates and to improve an overall throughput for real-time applications in wireless packet networks. The system initially divides wireless terminals into groups according to their signal path gains. Afterwards, the system can periodically adapt transmissions (i.e., link adaptations) based on the required error rates, actual error statistics and average transmission power for each wireless terminal group. Furthermore, transmission power can be adjusted by an enhanced Kalman-filter method to ensure successful reception.

13 Claims, 7 Drawing Sheets

PERFORMANCE COMPARISON OF LINK-ADAPTATION METHODS.

| CASES | PER FOR MODULATION LEVELS | | | | | | OVERALL PER | THROUGHPUT (Kbps) |
|---|---|---|---|---|---|---|---|---|
| | 1 | 2 | 3 | 4 | 5 | 6 | | |
| SINR-BASED ADAPTATION METHOD | | | | | | | | |
| A) WITHOUT PC | 0.61 | 0.061 | 0.092 | 0.10 | 0.12 | 0.10 | 0.17 | 44.15 |
| B) KALMAN PC ($P_R$=2%) | 0.59 | 0.067 | 0.098 | 0.10 | 0.12 | 0.11 | 0.16 | 45.67 |
| C) KALMAN PC ($P_R$= 5%) | 0.52 | 0.050 | 0.076 | 0.073 | 0.090 | 0.12 | 0.11 | 46.87 |
| D) KALMAN PC ($P_R$= 10%) | 0.13 | 0.076 | 0.088 | 0.090 | 0.093 | 0.083 | 0.093 | 39.19 |
| TERMINAL-GROUPING METHOD FOR ADAPTATION | | | | | | | | |
| E) WITHOUT PC ($P_R$= 2%) | 0.14 | 0.012 | 0.010 | 0.007 | 0.018 | 0.025 | 0.10 | 26.88 |
| F) WITHOUT PC ($P_R$=5%) | 0.15 | 0.026 | 0.026 | 0.011 | 0.017 | 0.060 | 0.10 | 26.88 |
| G) WITHOUT PC ($P_R$= 10%) | 0.19 | 0.045 | 0.060 | 0.052 | 0.026 | 0.060 | 0.11 | 33.34 |
| H) KALMAN PC ($P_R$= 2%) | 0.051 | 0.027 | 0.023 | 0.022 | 0.022 | 0.018 | 0.027 | 35.60 |
| I) KALMAN PC ($P_R$= 5%) | 0.061 | 0.052 | 0.055 | 0.050 | 0.055 | 0.041 | 0.053 | 38.74 |
| J) KALMAN PC ($P_R$= 10%) | 0.12 | 0.097 | 0.10 | 0.10 | 0.10 | 0.075 | 0.099 | 38.79 |

(56) References Cited

U.S. PATENT DOCUMENTS

| | | |
|---|---|---|
| 6,490,460 B1 | 12/2002 | Soliman |
| 6,549,785 B1 | 4/2003 | Agin |
| 6,603,746 B1 | 8/2003 | Larijani et al. |
| 7,502,340 B1 * | 3/2009 | Chuang et al. ............ 370/318 |
| 7,920,505 B2 * | 4/2011 | Chuang et al. ............ 370/318 |
| 8,432,863 B2 * | 4/2013 | Chuang et al. ............ 370/329 |
| 2009/0290541 A1 | 11/2009 | Nishio |
| 2010/0061359 A1 | 3/2010 | Fukuoka et al. |

* cited by examiner

SINR REQUIREMENT AND THROUGHPUT

| MODULATION LEVEL | SINR DETECTION REQUIREMENT (dB) | THROUGHPUT (Kbps) |
|---|---|---|
| 1 | 10 | 22.8 |
| 2 | 12 | 34.3 |
| 3 | 16 | 41.25 |
| 4 | 19 | 51.6 |
| 5 | 23 | 57.35 |
| 6 | 28 | 69.2 |

*FIG. 4*

PERFORMANCE COMPARISON OF LINK-ADAPTATION METHODS.

| CASES | PER FOR MODULATION LEVELS | | | | | | OVERALL PER | THROUGHPUT (Kbps) |
|---|---|---|---|---|---|---|---|---|
| | 1 | 2 | 3 | 4 | 5 | 6 | | |
| SINR-BASED ADAPTATION METHOD | | | | | | | | |
| A) WITHOUT PC | 0.61 | 0.061 | 0.092 | 0.10 | 0.12 | 0.10 | 0.17 | 44.15 |
| B) KALMAN PC ($P_R = 2\%$) | 0.59 | 0.067 | 0.098 | 0.10 | 0.12 | 0.11 | 0.16 | 45.67 |
| C) KALMAN PC ($P_R = 5\%$) | 0.52 | 0.050 | 0.076 | 0.073 | 0.090 | 0.12 | 0.11 | 46.87 |
| D) KALMAN PC ($P_R = 10\%$) | 0.13 | 0.076 | 0.088 | 0.090 | 0.093 | 0.083 | 0.093 | 39.19 |
| TERMINAL-GROUPING METHOD FOR ADAPTATION | | | | | | | | |
| E) WITHOUT PC ($P_R = 2\%$) | 0.14 | 0.012 | 0.010 | 0.007 | 0.018 | 0.025 | 0.10 | 26.88 |
| F) WITHOUT PC ($P_R = 5\%$) | 0.15 | 0.026 | 0.026 | 0.011 | 0.017 | 0.060 | 0.10 | 26.88 |
| G) WITHOUT PC ($P_R = 10\%$) | 0.19 | 0.045 | 0.060 | 0.052 | 0.026 | 0.060 | 0.11 | 33.34 |
| H) KALMAN PC ($P_R = 2\%$) | 0.051 | 0.027 | 0.023 | 0.022 | 0.022 | 0.018 | 0.027 | 35.60 |
| I) KALMAN PC ($P_R = 5\%$) | 0.061 | 0.052 | 0.055 | 0.050 | 0.055 | 0.041 | 0.053 | 38.74 |
| J) KALMAN PC ($P_R = 10\%$) | 0.12 | 0.097 | 0.10 | 0.10 | 0.10 | 0.075 | 0.099 | 38.79 |

*FIG. 5*

PROBABILITY OF TRANSMISSION AT VARIOUS MODULATION LEVELS FOR
THE TERMINAL-GROUPING METHOD WITH 100% TRAFFIC LOAD.

| TERMINAL GROUP | TARGET PER | MODULATION LEVEL | | | | | |
|---|---|---|---|---|---|---|---|
| | | 1 | 2 | 3 | 4 | 5 | 6 |
| 1 | 0.05 | 1.0 | 0.0 | 0.0 | 0.0 | 0.0 | 0.0 |
| 1 | 0.10 | 1.0 | 0.0 | 0.0 | 0.0 | 0.0 | 0.0 |
| 1 | 0.15 | 1.0 | 0.0 | 0.0 | 0.0 | 0.0 | 0.0 |
| 2 | 0.05 | 0.834 | 0.166 | 0.0 | 0.0 | 0.0 | 0.0 |
| 2 | 0.10 | 0.646 | 0.354 | 0.0 | 0.0 | 0.0 | 0.0 |
| 2 | 0.15 | 0.367 | 0.550 | 0.083 | 0.0 | 0.0 | 0.0 |
| 3 | 0.05 | 0.180 | 0.603 | 0.218 | 0.0 | 0.0 | 0.0 |
| 3 | 0.10 | 0.065 | 0.456 | 0.479 | 0.0 | 0.0 | 0.0 |
| 3 | 0.15 | 0.033 | 0.423 | 0.544 | 0.0 | 0.0 | 0.0 |
| 4 | 0.05 | 0.017 | 0.257 | 0.548 | 0.178 | 0.0 | 0.0 |
| 4 | 0.10 | 0.0 | 0.103 | 0.542 | 0.338 | 0.017 | 0.0 |
| 4 | 0.15 | 0.017 | 0.069 | 0.399 | 0.454 | 0.062 | 0.0 |
| 5 | 0.05 | 0.0 | 0.0 | 0.033 | 0.562 | 0.372 | 0.033 |
| 5 | 0.10 | 0.0 | 0.0 | 0.0 | 0.215 | 0.652 | 0.133 |
| 5 | 0.15 | 0.0 | 0.0 | 0.0 | 0.149 | 0.600 | 0.251 |
| 6 | 0.05 | 0.0 | 0.0 | 0.0 | 0.0 | 0.017 | 0.983 |
| 6 | 0.10 | 0.0 | 0.0 | 0.0 | 0.0 | 0.0 | 1.0 |
| 6 | 0.15 | 0.0 | 0.0 | 0.0 | 0.0 | 0.0 | 1.0 |

*FIG. 6*

PERFORMANCE OF THE TERMINAL-GROUPING METHOD AT VARIOUS TRAFFIC LOADING.

| TRAFFIC LOAD (%) | TARGET PER | MEASURED PER | THROUGHPUT (Kbps) |
|---|---|---|---|
| 100 | 0.02 | 0.027 | 35.60 |
| 100 | 0.05 | 0.053 | 38.74 |
| 100 | 0.10 | 0.099 | 38.79 |
| 100 | 0.15 | 0.144 | 38.08 |
| 100 | 0.20 | 0.188 | 36.86 |
| 80 | 0.02 | 0.023 | 36.98 |
| 80 | 0.05 | 0.050 | 39.36 |
| 80 | 0.10 | 0.094 | 38.88 |
| 80 | 0.15 | 0.136 | 37.91 |
| 80 | 0.20 | 0.176 | 36.43 |
| 60 | 0.02 | 0.023 | 41.39 |
| 60 | 0.05 | 0.052 | 44.20 |
| 60 | 0.10 | 0.097 | 42.53 |
| 60 | 0.15 | 0.138 | 40.75 |
| 60 | 0.20 | 0.171 | 39.30 |
| 40 | 0.02 | 0.023 | 45.43 |
| 40 | 0.05 | 0.050 | 45.04 |
| 40 | 0.10 | 0.093 | 43.18 |
| 40 | 0.15 | 0.128 | 41.56 |
| 40 | 0.20 | 0.161 | 40.07 |

*FIG. 7*

METHOD AND SYSTEM FOR INTEGRATED LINK ADAPTATION AND POWER CONTROL TO IMPROVE ERROR AND THROUGHPUT PERFORMANCE IN WIRELESS PACKET NETWORKS

CROSS-REFERENCE TO RELATED APPLICATION(S)

This application in a continuation of U.S. patent application Ser. No. 13/037,306, filed Feb. 28, 2011, entitled "Method and System for Integrated Link Adaptation and Power Control to Improve Error and Throughput Performance in Wireless Packet Networks," which is a continuation of U.S. patent application Ser. No. 12/381,292, filed Mar. 10, 2009, entitled "Method and System for Integrated Link Adaptation and Power Control to Improve Error and Throughput Performance in Wireless Packet Networks," now U.S. Pat. No. 7,920,505, which is a continuation of Ser. No. 09/570,097, filed May 12, 2000, entitled "Method and System for Integrated Link Adaptation and Power Control to Improve Error and Throughput Performance in Wireless Packet Networks," now U.S. Pat. No. 7,502,340. U.S. patent application Ser. No. 13/037,306, filed Feb. 28, 2011, entitled "Method and System for Integrated Link Adaptation and Power Control to Improve Error and Throughput Performance in Wireless Packet Networks," is incorporated herein by reference.

BACKGROUND

1. Field of the Invention

The present invention relates to a method and system for integrated link adaptation and power control in wireless networks to improve error and throughput performance of a wireless network.

2. Description of the Related Art

As telecommuting and Internet access become increasingly popular, customer demand for broadband network services is increasing. In the very near future, broadband services are also expected to support real-time, multimedia services such as voice, image and video. Wireless access is one of the approaches to providing such services. In particular, the European Telecommunications Standards Institute is in the process of establishing the protocol standards for the Enhanced Data rates for GSM Evolution (EDGE) system as a third generation of wireless networks for high-speed services. Using packet-switching technology, and multiple modulation and coding levels (to be referred to as modulation levels below for brevity), the EDGE system employs a link-adaptation technique to adapt packet transmissions to one of several modulation levels where the highest data rate can exceed 384 Kbits/sec.

The idea of link adaptation is to adapt the modulation encoding levels according to the channel and interference conditions in order to improve data throughput. For example, when the channel and interference conditions are poor, a low modulation level (i.e., few information bits per symbol) and/or heavy coding should be used in a packet transmission to enable correct signal detection. On the other hand, if the channel situations are more favorable, a high modulation level and/or light coding can be used to increase the data rate.

Due to unreliable radio links, it is challenging to assure a quality of service (QoS) in terms of packet error rate (PER) in a wireless network. For real-time services, such as IP voice, music and video, stringent delay requirements severely limit or even preclude re-transmission of lost packets. Therefore, tight delay requirements often translate into stringent requirements for the PER. As a result, in order to support such real-time services, it is important to design wireless networks such that the required QoS can be delivered to the users.

Currently, it is known that link adaptation is helpful in delivering a particular QoS. Specifically, when a channel condition is poor, transmitters can lower modulation levels to decrease the requirement of the signal-to-interference-plus-noise ratio (SINR) for correct signal detection. Lowering the SINR requirements increases the probability of successful reception, and therefore helps to meet particular PER objectives.

However, especially for interference-limited systems with sufficient traffic load, adapting even to the lowest modulation level may not always guarantee meeting the specified PER. In this case, increasing a transmission power can improve signal strength, and therefore the SINR at the receivers. Hence, power control can be viewed as performing an active role in delivering the expected PER to users, while link adaptation or adaptive modulation plays a passive (or reactive) role.

Accordingly, a key design problem for a wireless packet network, such as the EDGE system, is how to maximize the overall network throughput over the choice of modulation levels, and transmission power, subject to meeting given PER requirements.

SUMMARY OF EMBODIMENTS OF THE INVENTION

The present invention provides a system and method for implementing a heuristic algorithm for integrated link adaptation and power control to achieve specified error rates and to improve an overall throughput for real-time applications in wireless packet networks. The method initially divides wireless terminals into groups according to their signal path gains. Afterwards, the method can periodically adapt transmissions (i.e., link adaptations) based on the required error rates, actual error statistics and average transmission power for each wireless terminal group. Furthermore, transmission power can be adjusted by an enhanced Kalman-filter method to ensure successful reception.

In at least one embodiment of the invention, a method includes updating a modulation level of a wireless terminal in a cell based on a target packet error rate and a packet error rate determined based on packet transmissions received from a group of wireless terminals in the cell. The group includes the wireless terminal. Each of the wireless terminals in the group have a signal path gain within a first range of signal path gains, the first range being one of a plurality of non-overlapping intervals of a range of signal path gains for the wireless terminals. The group may be one of a plurality of groups of wireless terminals in the cell. A total number of groups of the plurality of groups may be chosen based on a number of available modulation levels.

BRIEF DESCRIPTION OF THE DRAWINGS

The invention is described in detail with regard to the following Figures, in which like elements are referred to with like numerals, and in which:

FIG. 4 shows exemplary modulation levels for corresponding SINR detection requirement and data throughput rates;

FIG. 5 is a table showing a comparison of various link-adaptation methods;

FIG. 6 is a probability distribution of various modulation levels; and

FIG. 7 is a table showing the performance of a terminal-grouping method at various traffic loading.

DETAILED DESCRIPTION OF PREFERRED EMBODIMENTS

Figure 1:
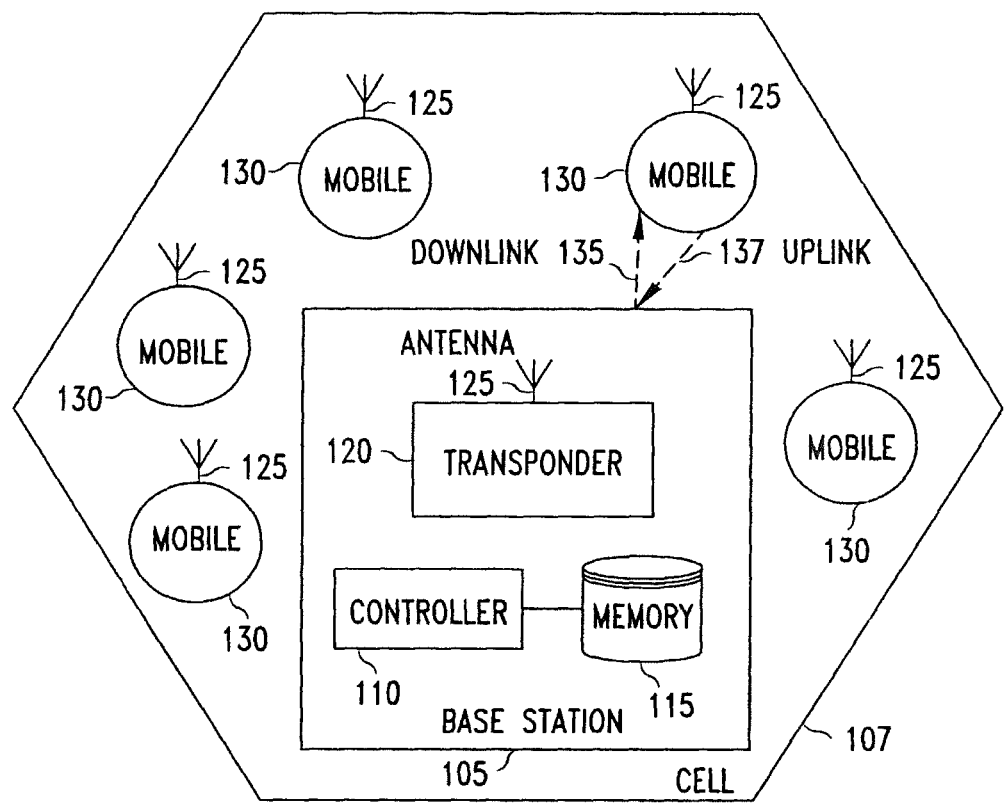
FIG. 1 is an exemplary block diagram depicting one cell of a wireless communication network in accordance with the present invention.

FIG. 1 is an exemplary block diagram depicting one cell 107 of a wireless cellular communication network. A base station 105 operates within the cell 107. The base station 105 contains a controller 110, a memory 115, a transponder 120, and an antenna 125. Numerous mobile terminals 130 located within the cell 107 communicate with the base station 105 via antenna 125, an uplink channel 137 and a downlink channel 135.

For the purposes of this application, a number of environmental and system conditions can be assumed. In particular, the uplink channel 137 and the downlink channel 135 are each subject to attenuation due to path gain (effectively, attenuation) between the base station 105 and the mobile terminal 130. Effectively, the path gain is the sum of the path loss and the shadow fading for the radio link.

Furthermore, a medium-access control (MAC) protocol is used within each cell 107, which allows at most one mobile terminal 130 in each of the cells 107 to transmit at a time. That is, no data contention occurs within the same cell 107. Therefore, only one mobile terminal 130 communicates with the base station 105 in a given time slot. Due to the large volume of data involved, the base station 105 typically cannot exchange control and scheduling information with another base station 105 operating in a different cell 107. Finally, the interference power for a particular time slot can be measured at the base station 105 and mobile terminals 130, but may include noise and errors.

In operation, communications between the base station 105 and the mobile terminals 130 are transmitted using an integrated link adaptation and power control to achieve specific packet error rates (PER) and to improve overall throughput for real-time applications in wireless packet networks. There are two key factors for efficient link-adaptation schemes. First, in order to maximize the network throughput, it is desirable to have a link-adaptation technique that adapts quickly to changes of radio conditions. On the other hand, to guarantee the required PER, it is advantageous to adapt the link according to an actual error performance or error statistics. Since error statistics can require a long time to accumulate, link adaptation based on per-user error performance is often too slow for responding to changes of a channel's condition. Accordingly, the present invention can estimate the per-user error performance by dividing all the mobile terminals 130 in each cell 107 into groups. Once divided, a link adaptation technique can be performed on a per-terminal-group basis according to an error performance of each group. In this manner, the error statistics collection time can be shortened significantly, and thereby enable a quick link adaptation to improve data throughput while meeting the necessary error requirements.

In a preferred embodiment, the mobile terminals 130 can be grouped by signal path gains. The quality of a radio link between a mobile antenna 125 and its associated base station 105 can typically be characterized by three parameters: the signal path gain (including shadow fading), the signal transmission power and interference power. However, in packet networks, both the signal transmission and interference power are constantly changing. By contrast, the signal path gain is generally the most intrinsic parameter for link quality. Accordingly, with the present invention, it is preferable to use the signal path gain as a criterion for the terminal grouping. The mobile terminals 130 of the same group are generally expected to have a similar link quality and to cause a similar amount of interference with others.

Figure 2:
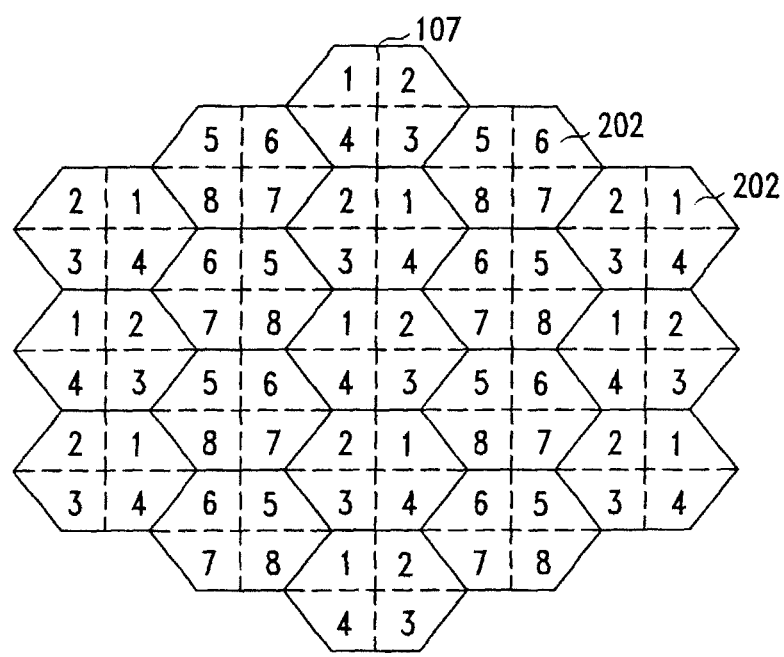
FIG. 2 shows a cell layout and channel assignment for a group of cells.
Figure 3:
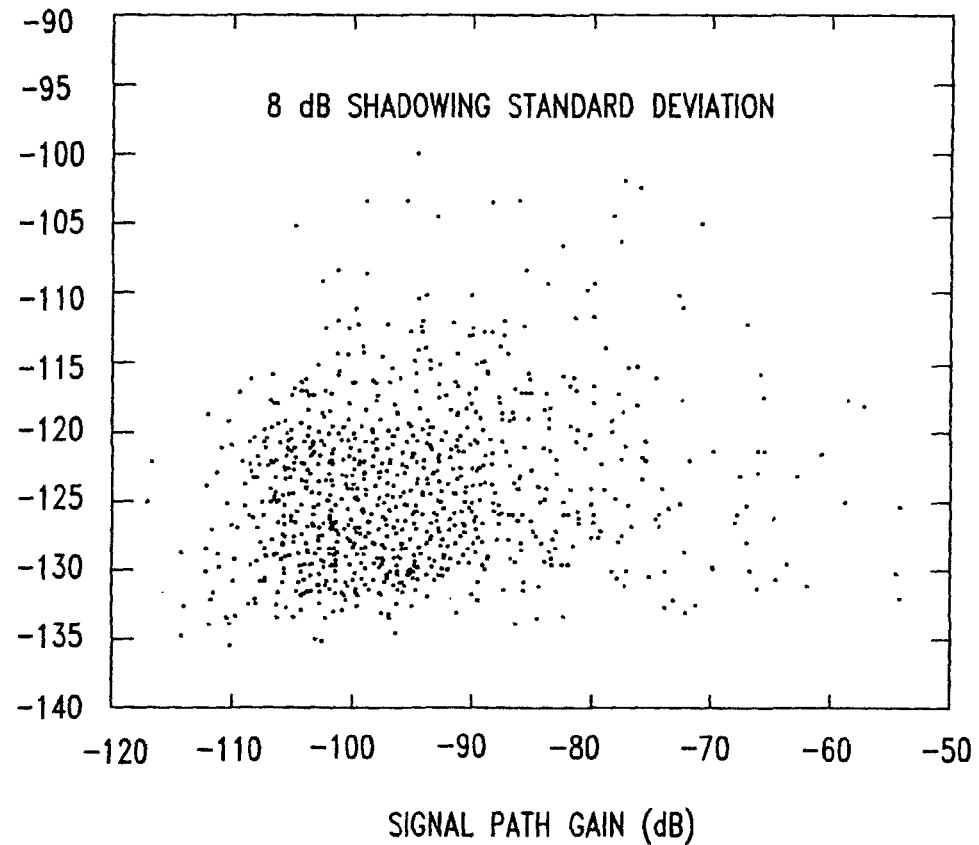
FIG. 3 is a graph showing an exemplary relationship between interference and signal path gain from a mobile terminal and a base station.

Another reason for using signal path gain as the grouping criterion is that the signal and interference path gains are almost uncorrelated. By way of example, consider the cellular layout and channel assignment of a frequency reuse factor of 2 in FIG. 2, where 2000 terminals are randomly populated at fixed locations in each cell 107. With typical radio propagation assumptions, FIG. 3 shows the relationship between the signal path gain (shadowing included) from a mobile terminal 130 to its associated base station 105 and the sum of the path gains from the mobile terminal 130 to all other co-channel base stations 105, which receive interference from the mobile terminal 130 for uplink transmission. The sum of the interfering path gains reflects the potential impacts of interference caused by the mobile terminals 130.

From FIG. 3, it can be found that the signal path gain and the sum of interfering path gains have a very small correlation coefficient of 0.018. Such uncorrelated relationship is desirable for the purposes of the present invention. Otherwise, if the correlation between the signal path gain and the sum of interfering path gain is a strong positive correlation, the link adaptation based on such a terminal group basis may make unstable changes in the modulation level.

One method of performing the mobile terminal 130 grouping is to determine a range of possible signal path gain for a given network, then divide the range into several regions. It should be noted that the region need not necessarily be uniform. Accordingly, a group will include the mobile terminals 130 with corresponding signal path gains in each region. In order to speed up the collection of error statistics uniformly, it is desirable to have a roughly equal number of mobile terminals 130 in each group. Furthermore, the number of mobile terminal groups can be chosen to be equal to the number of modulation levels in the system so that each group may be transmitting or receiving at a distinct modulation level. Furthermore, the number of groups should be selected based on the number of active mobile terminals 130. If there are too few mobile terminals 130 per group, then the purpose of the mobile terminal grouping in terms of shortening the statistic collection is defeated.

In operation, for uplink transmissions for each cell 107 or co-channel sector, the base station 105 as the receiver continuously collects error statistics, and computes a packet error rate (PER) for every K packet transmissions from terminals of each group. In addition, the base station 105 keeps tracks of the average transmission power $\bar{p}$ of the K packet transmissions, regardless of their modulation level, for each terminal group.

Every time K packets have been transmitted by mobile terminals 130 of the same group and received by the base station, the base station determines a packet error rate (PER) for the group. If the PER is higher than a required PER, the base station can adjust the modulation level down by one level for the next K packet transmission by the mobile terminals 130 in the group. The purpose of stepping down the modulation level is to lower the required signal-to-interference-to-noise-ratio (SINR) for correct reception, thereby improving the PER when necessary.

Since the base station instructs the mobile terminals to transmit at appropriate power level, the base station has the knowledge of the transmission power. If the average transmitted power of the last K packets $\bar{p}$ is less than a given threshold $p_t$ (e.g., 15 dBm), the base station can step up the modulation level by one level for the next K transmission from the terminal group. The idea is to utilize unused power and to increase data rate, if possible.

In order to achieve the PER requirement, each modulation level is associated with a nominal SINR target. Using an enhanced Kalman-filter power control, the transmission power is adjusted for each time slot to achieve the SINR target for the adapted modulation level. That is, the transmission power for time slot n is set to be $$p(n)=\gamma^* \delta(n) \tilde{i}(n)/g(n) \qquad (1)$$

where $\gamma^*$ is the SINR target for the chosen modulation level, $\tilde{i}(n)$ is the interference-plus-noise power (mW) in slot n predicted by the Kalman filter, $\delta(n)$ is an error margin, and $g(n)$ is the (estimated) path gain between the terminal that transmits in slot n and its base station.

The error margin $\delta(n)$ is obtained by tracking the accuracy of the interference power predicted by the Kalman filter. More precisely, let $\Delta$ (a random variable in dB) be the error of the Kalman-filer prediction and the error for slot n be $$E(n)=I(n)-\tilde{I}(n) \qquad (2)$$

where $I(n)$ and $\tilde{I}(n)$ are the measured and predicted interference-plus-noise power in dBm for slot n, respectively. Based on the $E(n)$'s, the cumulative probability function (CDR) for $\Delta$ is approximated. Towards this end, let there be J intervals of prediction error and let the range of the $j^{th}$ interval be $(a_j, a_{j+1})$. For each time slot n>0 and each j=1 to J, compute the following:

$$P_n^j = \begin{cases} \phi P_{n-1}^j & \text{if } E(n) > a_{j+1} \\ \phi P_{n-1}^j + 1 - \phi & \text{otherwise} \end{cases} \qquad (3)$$

where $P_n^j$ is the approximate probability of $\Delta \leq a_{j+1}$ based on the error sequence $E(n)$ up to slot n with $P_o^j=1$ for all j=1 to J initially, and $\phi$ is a properly chosen parameter between 0 and 1. Let $\Delta(n)$ be a specified $\omega^{th}$ percentile (e.g., for 90th percentile, $\omega=0.9$) of $\Delta$ based on the error statistics up to slot n. We approximate $\Delta(n) \approx a_k$ where k is the smallest from 1 to J such that $P_n^k \geq \omega$. Let $\delta(n)$ and $\tilde{i}(n)$ be the linear-scale equivalent of $\Delta(n)$ and $\tilde{I}(n)$, respectively. The corresponding percentile of the interference-plus-noise power in mW is the product of $\tilde{i}(n)$ (predicted by the Kalman filter) and $\delta(n)$. Accordingly, the transmission power for slot n is determined by equation (1).

In essence, the term $\delta(n)$ represent an error margin, which depends on the accuracy of the interference prediction by the Kalman filter and the specified confidence probability $\omega$. Nevertheless, the error margin is chosen dynamically and appropriately with a goal of delivering the SINR target $\gamma^*$ regardless of the actual message length and control delay.

Furthermore, after the modulation level for each terminal has been adjusted, a minor adjustment (e.g., a fraction to a couple of dB's) can be added to the nominal target to obtain the actual SINR target $\gamma^*$ for proper power control by equation (1). Such an adjustment is revised periodically and relatively slowly (i.e., similar to the CDMA outer-loop power control) to ensure required error performance for individual mobile terminals 130.

An example of enhanced Kalman-filter power control with an error margin is disclosed in application Ser. No. 09/460,993 filed on Dec. 15, 1999, entitled "A Method and System for Power Control in Wireless Networks Using Interference Prediction with an Error Margin," which is incorporated herein by reference in its entirety.

It is worth noting that the base station 105 steps down the modulation level due to unsatisfactory PER performance, and moves the modulation level up in a case of under-utilized power. Additionally, it is possible that the PER does not meet the required performance and the average transmission power is also below the threshold $p_t$. This can be due to the fact that the Kalman filter cannot predict interference-plus-noise power accurately enough. Since the power control includes the error margin $\delta(n)$, which possibly changes from one time to the next, slight increases in the $\delta(n)$ because of the inaccurate predictions (thus using a small fraction of unused power) may be enough to meet the PER requirement. Therefore, the modulation level remains unchanged for those cases, with a hope that the PER becomes satisfactory for the next K packet transmissions by power control.

In order to further describe the performance of the present invention, a computer simulation is used to describe the performance of the proposed technique for link adaptation and power control based on the terminal grouping, which is referred to as the terminal-grouping method. The computer simulation simulates a cell layout and interleaved channel assignment (ICA) with a frequency reuse factor of 2, as shown in FIG. 2. Each cell 107 is divided into 4 sectors 202, each of which is served by a base station antenna at the center of the cell 107. The beamwidth of each base station antenna is 60°, while terminals have omni-directional antennas. Each radio link between a terminal 130 and its base station 105 is characterized by a path-loss model with an exponent of 4 and lognormal shadow fading with a standard deviation of 8 dB. Fast fading was not considered in this simulation. Cell 107 radius is assumed to be 1 Km and the path loss at 100 m from the cell center is −70 dB. Thermal noise power at the receiver is fixed and equal to −110 dBm. Each sector 202 is populated with 500 terminals randomly and each of them selects the base station 105 that provides the strongest signal power. For convenience, terminals in all cells 107 are assumed to be synchronized at the slot boundary for transmission. Furthermore, unless stated otherwise, we assume 100% traffic load in this simulation. That is, there are always terminals 130 ready for transmission in each co-channel sector 202. Message length is assumed to be Pareto distributed with an average of 10 packets.

The enhanced Kalman-filter method, described above, is used to control transmission power for each time slot. For tracking the CDF of the prediction error $\Delta$, $\phi$ in equation (3) is set to be 0.999 (approximately equal to tracking the error over a sliding window of 1,000 slots) and the number of error intervals J is 100. For a given PER requirement $P_R$, the $\omega^{th}$ percentile of the prediction error with $\omega=1-P_R$ is used in determining the error margin $\delta(n)$ for adjusting power in equation (1). For example, when $P_R=0.02$, $\delta(n)$ is the $98^{th}$ percentile of the predication error. In any event, transmission power is limited between 0 to 30 dBm. The average power threshold, $p_t$, for determining the stepping up of the modulation level, described above, is 15 dBm. Two adjustable parameters for the Kalman-filter method, W and $\eta$, are set to be 30 and 0.5 respectively. The simulation also assumes that interference power in one time slot can be measured accurately and used to determine the power for a next slot.

Furthermore, for the purposes of the simulation, we assume that the system has six modulation levels. The SINR detection requirements and the corresponding data throughput for each modulation level are shown in FIG. 4. For example, for a packet transmission using modulation level 1, if the SINR at the receiver is greater than 10 dB, the packet is received successfully and the data throughput is 22.8 Kbps. Naturally, the SINR requirements are also used as the targets $\gamma^*$ for various modulation levels to control power in equation (1). For simplicity, slow and minor adjustment of SINR targets for individual terminals is not considered in the simulation.

With 6 modulation levels, all 500 terminals in each sector 202 are divided into six groups of equal size according to their signal path gain. Initially, the group with the weakest to the strongest signal path gain uses modulation level 1 to 6 for transmission, respectively. Then, according to the algorithm, the modulation level is re-adapted every K=1,000 packets transmitted by each terminal group. For each parameter setting, the simulation model was run for 0.4 million time slots and performance results presented below were obtained for the middle cell in FIG. 2.

To set up a basis for comparison, the simulation considered a simple link-adaptation scheme without power control (PC) that chooses the modulation level according to the SINR measurement of the previous time slot. This method is referred to as the SINR-based adaptation method. Specifically, the scheme compares the SINR measurement with the detection requirements in FIG. 4. For example, when the measurement lies between 12 and 16 dB, modulation level 2 is used for transmission in the next time slot. Every sector 202 makes such selection for its transmitting terminal independently. This SINR scheme is referred to as Case A in FIG. 5. Cases B to D are identical to Case A, except that the enhanced Kalman method is now used to control transmission power according to the various PER requirements $P_R$. To assist in the understanding of the technique, Cases E to G correspond to the link-adaptation method by terminal grouping without power control, while Cases H to J represent the technique of the present invention. FIG. 5 presents the throughput, the PER for packets transmitted at different modulation levels, and the overall PER averaged over all levels for these cases.

To begin with, it can be seen from FIG. 5 that when power control is not used, Cases A and E to G for both the SINR and terminal-grouping methods cannot control the PER effectively. For the SINR method, it is so because the previous SINR measurements may not accurately predict SINR performance in future time slots because of the burstiness of packet transmission in the wireless packet environment. As a result, the chosen modulation level may not lead to successful packet reception as the radio conditions can change drastically in time. As for Cases E to G, the terminal-grouping method adapts the modulation level according to the requirement $P_R$. However, the scheme is not effective in delivering the PER performance because the link adaptation takes place only periodically and the radio conditions can vary significantly from one time slot to another during the adaptation period.

As the results for Cases B to D show, the SINR scheme with the enhanced Kalman power control is still not quite effective because SINR measurements may not accurately reflect future link quality. In contrast, according to the specified PER requirement $P_R$ the proposed algorithm adapts transmissions at appropriate modulation levels, and adjusts transmission power to meet the SINR detection threshold. Consequently, as shown in FIG. 5, the PER performance for Cases H to J generally comes very close to the PER target $P_R$. One can observe that the PER for transmission at modulation level 1 in Case H is noticeably higher than the required 2% PER. This reveals that the radio conditions may not support the very stringent PER performance for a very small fraction of terminals. In any event, the overall PER of 2.7% is very close to the target of 2% in that case. As intuitively expected, when $P_R$ becomes less stringent, the throughput is increased in Cases H to J.

It is important to point out that the ability to control the PER to meet the specified targets by the proposed algorithm comes at a price of reduced throughput. In fact, this represents an interesting tradeoff between maximizing throughput and controlling PER performance. For example, one can see from FIG. 5 that the SINR method in Cases A to D yields almost ⅓ more throughput than Cases H to J of the terminal-grouping method. Nevertheless, to meet the PER requirements for specific applications, network designers can use the integrated algorithm for power control and link adaptation to achieve a desirable tradeoff between the PER and throughput.

FIG. 6 presents the probability distribution of the modulation levels for actual packet transmission for the proposed algorithm for various target PER. For example, for terminal group 4, the probability of packet transmission using modulation level 4 is 0.178, 0.338 and 0.454 for the target PER of 5%, 10% and 15%, respectively. This confirms the expected operations of the proposed algorithm because for less stringent PER requirements, the algorithm will tend to step up the modulation level for transmission.

Finally, we study the packet error and throughput performance of the proposed algorithm with partial traffic loading. For a given loading, after a terminal completes a message transmission, its associated sector remains idle for a random number of time slots before a next terminal in the sector is allowed to start a new message transmission. The duration of an idle period is geometrically distributed and its average is determined according to the average message length and the traffic loading.

FIG. 7 presents the measured PER and throughput of the proposed algorithm for various target (required) PER and traffic load conditions. First, it can be seen that the proposed algorithm indeed can deliver the required PER performance as the measured PER comes very close to the target values. Second, it is interesting to note that the throughput increases as traffic load decreases. This is a very desirable feature because the power control in the proposed algorithm will detect reduced interference power when traffic load decreases, thus lowering the transmission power needed to yield the SINR target $\gamma^*$ in equation (1). In turn, comparing the average transmission power with a fixed threshold $p_t$ will likely step up the modulation level for transmission, which results in increased data throughput. Third, FIG. 7 reveals that for a given traffic load, the throughput does not always improve as the target PER is increased (relaxed). Evidently, for very stringent PER requirements, the algorithm will force most of the transmissions using the more robust modulation, which yields a low throughput. On the other hand, when the required PER is too high, the algorithm tends to allow too many packets transmitted using high modulation levels, which result in unsuccessful reception and lowered throughput. For a given traffic load, there appears to be an "optimal" target PER that can maximize the network throughput.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention as described in the following claims.

What is claimed is:

1. A method comprising:
   determining a packet error rate for packet transmissions received from a group of wireless terminals in a cell, the group being one of a plurality of groups of wireless terminals in the cell, a total number of groups of the plurality of groups being based on a number of available modulation levels; and
   updating a modulation level of a wireless terminal of the group of wireless terminals based on a target packet error rate and the packet error rate, the group including the wireless terminal, each of the wireless terminals in the group having a signal path gain within a first range of signal path gains, the first range being one of a plurality of non-overlapping intervals of a range of signal path gains for the wireless terminals.

2. The method, as recited in claim 1, wherein each wireless terminal in the cell is associated with a corresponding group of the plurality of groups.

3. The method, as recited in claim 1, wherein a corresponding modulation level for each of the wireless terminals in the group is updated to achieve a target signal-to-interference-to-noise ratio.

4. The method, as recited in claim 1, further comprising:
   dividing the range of signal path gains for the wireless terminals in the cell into a plurality of non-overlapping gain intervals, each having a lower boundary signal path gain and an upper boundary signal path gain.

5. The method, as recited in claim 1,
   associating, with each interval, a corresponding group of the wireless terminals in the cell having signal path gains between the lower and upper boundaries of the interval.

6. The method, as recited in claim 1, further comprising:
   adjusting the modulation level for the wireless terminal according to an error margin associated with an interference prediction used to determine a nominal signal-to-interference ratio target for the modulation level.

7. An apparatus comprising:
   an antenna; and
   a controller configured to update a modulation level of a wireless terminal in a cell based on a target packet error rate and a packet error rate determined based on packet transmissions received using the antenna from a group of wireless terminals in the cell, the group including the wireless terminal, each of the wireless terminals in the group having a signal path gain within a first range of signal path gains, the first range being one of a plurality of non-overlapping intervals of a range of signal path gains for the wireless terminals, the group being one of a plurality of groups of wireless terminals in the cell, a total number of groups of the plurality of groups being based on a number of available modulation levels.

8. The apparatus, as recited in claim 7, wherein the controller is further configured to determine the packet error rate for packet transmissions received using the antenna.

9. The apparatus, as recited in claim 7, wherein each wireless terminal in the cell is associated with a corresponding group of the plurality of groups.

10. The apparatus, as recited in claim 7, wherein a corresponding modulation level for each of the wireless terminals in the group is updated to achieve a target signal-to-interference-to-noise ratio.

11. The apparatus, as recited in claim 7, wherein the controller is further configured to divide the range of signal path gains for the wireless terminals in the cell into a plurality of non-overlapping gain intervals, each having a lower boundary signal path gain and an upper boundary signal path gain.

12. The apparatus, as recited in claim 7, wherein the controller is further configured to associate, with each interval, a corresponding group of the wireless terminals in the cell having signal path gains between the lower and upper boundaries of the interval.

13. The apparatus, as recited in claim 7, wherein the controller is further configured to adjust the modulation level for the wireless terminal according to an error margin associated with an interference prediction used to determine a nominal signal-to-interference ratio target for the modulation level.

* * * * *